United States Patent
Zach

(10) Patent No.: US 9,818,195 B2
(45) Date of Patent: Nov. 14, 2017

(54) OBJECT POSE RECOGNITION

(71) Applicant: Kabushiki Kaisha Toshiba, Minato-ku (JP)

(72) Inventor: Christopher Zach, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/074,438

(22) Filed: Mar. 18, 2016

(65) Prior Publication Data
US 2016/0275686 A1    Sep. 22, 2016

(30) Foreign Application Priority Data
Mar. 20, 2015 (GB) .................... 1504750.9

(51) Int. Cl.
| | |
|---|---|
| G06K 9/68 | (2006.01) |
| G06T 7/00 | (2017.01) |
| G06K 9/52 | (2006.01) |
| G06K 9/62 | (2006.01) |
| G06T 7/73 | (2017.01) |

(52) U.S. Cl.
CPC .............. *G06T 7/0042* (2013.01); *G06K 9/52* (2013.01); *G06K 9/6201* (2013.01); *G06T 7/73* (2017.01); *G06T 2207/10028* (2013.01)

(58) Field of Classification Search
CPC ........... G06T 7/0041; G06T 7/60; G06T 7/00; G06T 2200/04; G06T 7/0042; G06K 9/52; G06K 9/6201; H04N 7/18
See application file for complete search history.

(56) References Cited

U.S. PATENT DOCUMENTS

| | | | | |
|---|---|---|---|---|
| 9,342,888 | B2* | 5/2016 | Menashe | G01S 5/163 |
| 9,607,388 | B2* | 3/2017 | Lin | G06T 7/74 |
| 2003/0035098 | A1 | 2/2003 | Ishiyama | |
| 2005/0147291 | A1* | 7/2005 | Huang | G06K 9/6282 382/159 |
| 2007/0031001 | A1* | 2/2007 | Hamanaka | G06K 9/00248 382/103 |
| 2008/0260238 | A1* | 10/2008 | Pfister | G06K 9/00208 382/154 |
| 2009/0202174 | A1* | 8/2009 | Shiba | G06K 9/4633 382/282 |
| 2010/0098324 | A1 | 4/2010 | Fujieda | |

(Continued)

FOREIGN PATENT DOCUMENTS

| | | |
|---|---|---|
| JP | WO 2008/111452 A1 | 6/2010 |
| JP | 2012-113353 A | 6/2012 |
| WO | WO 2011/105615 A1 | 9/2011 |

OTHER PUBLICATIONS

British Search Report dated Aug. 27, 2015 in Great Britain Application 1504750.9 filed on Mar. 20, 2015.

(Continued)

*Primary Examiner* — Amir Alavi
(74) *Attorney, Agent, or Firm* — Oblon, McClelland, Maier & Neustadt, L.L.P.

(57) ABSTRACT

A method for use in estimating a pose of an imaged object comprises identifying candidate elements of an atlas that correspond to pixels in an image of the object, forming pairs of candidate elements, and comparing the distance between the members of each pair and with the distance between the corresponding pixels.

15 Claims, 8 Drawing Sheets

(56) References Cited

U.S. PATENT DOCUMENTS

2010/0215271 A1* 8/2010 Dariush ............. G06K 9/00369
                                                              382/180
2011/0211066 A1   9/2011 Fujiki
2016/0086336 A1*  3/2016 Lin ....................... G06T 7/0044
                                                              348/50
2016/0275686 A1*  9/2016 Zach .................... G06T 7/0042

OTHER PUBLICATIONS

Office Action dated May 9, 2017 in Japanese Patent Application No. 2016-055730.
Yoshinori Kuno, et al., "Use of Object Models in Recognition Strategy Generation and Localization" Technical Report of the Institute of Electronics, Information and Communication Engineers, vol. 90, No. 122, Jul. 1990, pp. 85-92 (with English Abstracts and English language translation).

* cited by examiner

OBJECT POSE RECOGNITION

FIELD

This disclosure relates to a method for use in estimating a pose of an imaged object. In particular, but without limitation, this disclosure relates to a method for use in estimating a pose of an imaged object based on depth images.

BACKGROUND

The task of object recognition involves finding and identifying objects in images or videos, while the task of pose estimation involves estimating the pose of objects which have been recognised. Object recognition and pose estimation are challenging problems for computer vision algorithms, especially when objects are partially occluded. Object recognition and pose estimation may be attempted using colour images, or alternatively, in situations where colour cues are not available or are unreliable, may be attempted using only depth information.

SUMMARY

Aspects and features of the invention are set out in the appended claims.

BRIEF DESCRIPTION OF THE DRAWINGS

Examples of the present disclosure will now be explained with reference to the accompanying drawings in which.

Throughout the description and the drawings, like reference numerals refer to like parts.

DETAILED DESCRIPTION

Figure 1:
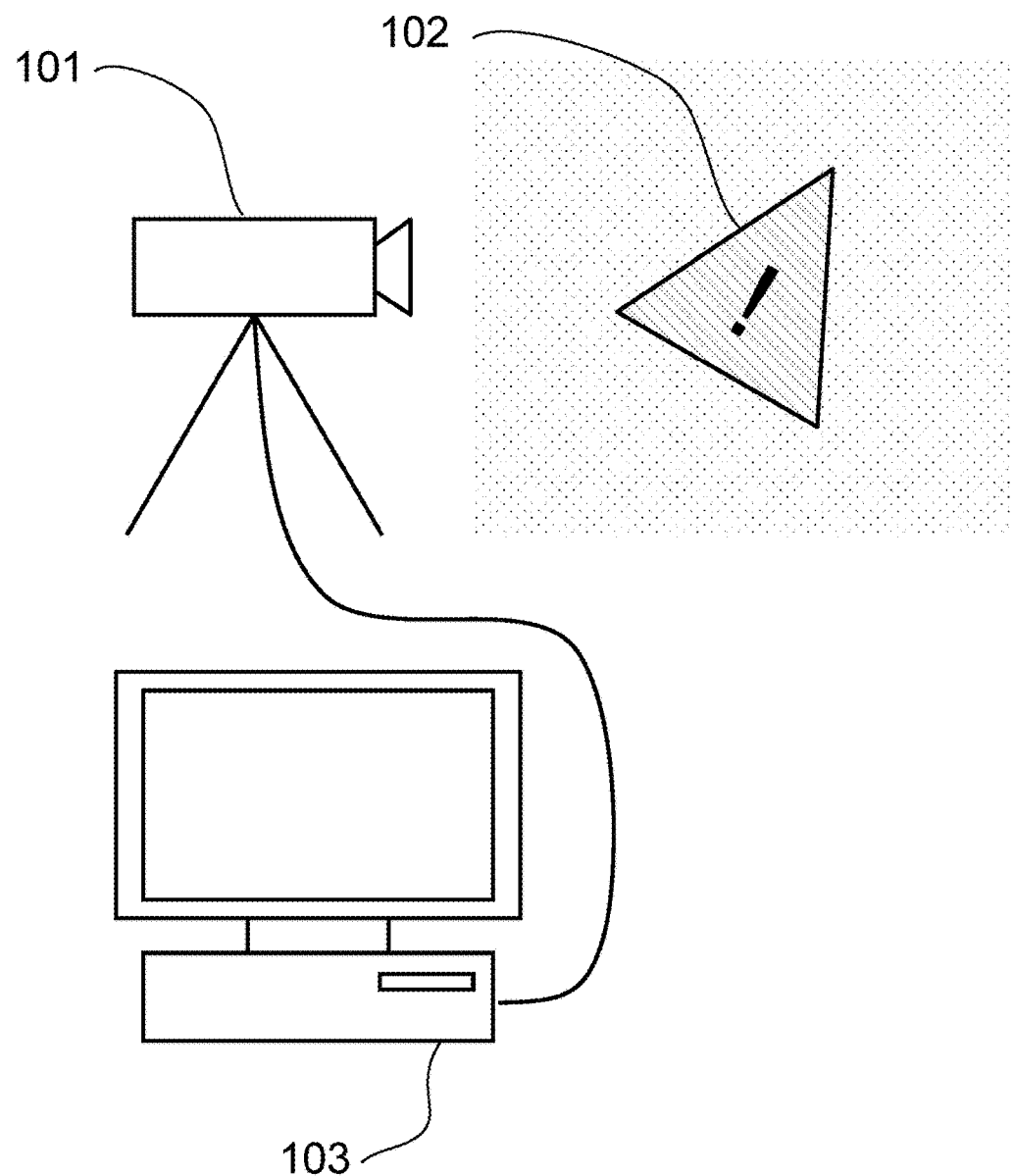
FIG. 1 shows a system for use in acquiring an image of an object.

FIG. 1 illustrates a system for use in acquiring an image of an object 102 (henceforth 'an imaged object'). Examples of imaged objects include: in a gesture recognition application, a hand or a part thereof; in an infrastructure inspection application, a building block or a part thereof, or a building or a part thereof; and in an obstacle avoidance application, a hazard or an obstacle.

An image-acquiring device 101 is arranged to acquire an image representing, in three spatial dimensions, a scene including the imaged object 102. The image-acquiring device 101 may be any kind of device that is capable of acquiring an image containing data about the depth of an image point with respect to the image acquiring device 101. Examples of the image acquiring device 101 include: a time-of-flight camera, a structured-light 3D scanner (such as a Microsoft Kinect device), an ultrasound distance measurer, a laser rangefinder, a LiDAR device, and a shape from X apparatus, such as a shape from (passive) stereo apparatus and/or a shape from shading apparatus. Further, the approaches described herein may be applied to any image representing a scene in three spatial dimensions. The image-acquiring device 101 is coupled, physically and/or wirelessly, to a processing device 103, which is arranged to process images acquired by the image acquiring device 101 in order to estimate a pose of the imaged object 102.

Figure 2:
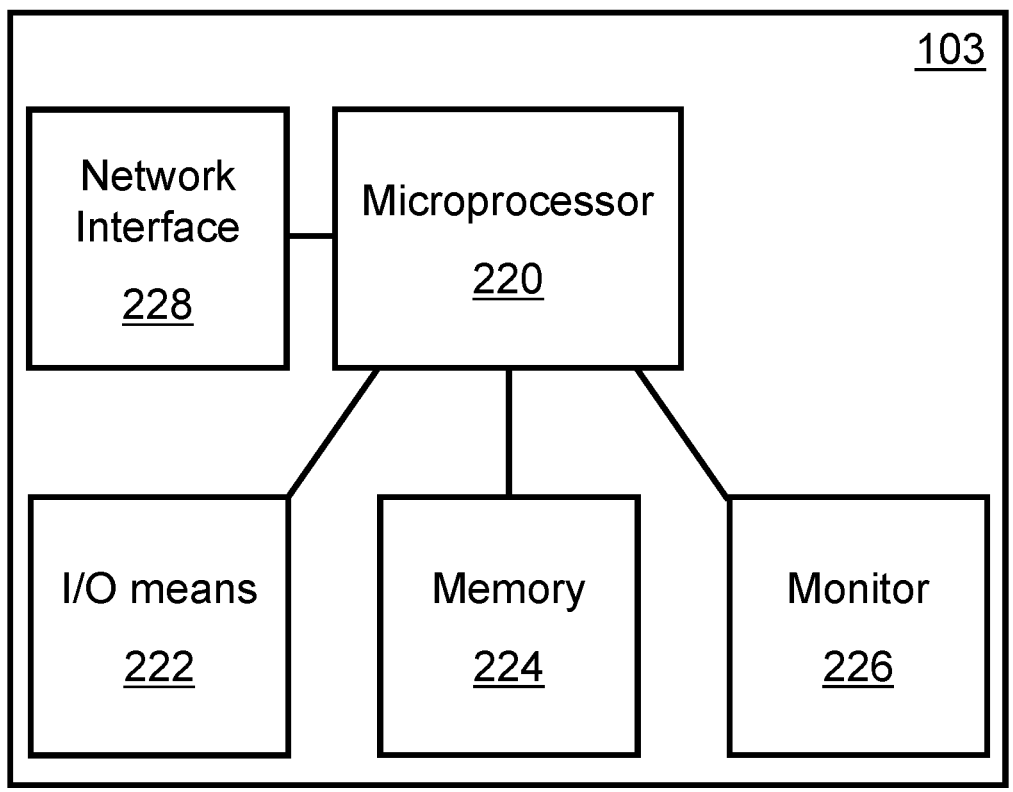
FIG. 2 shows an exemplary block diagram of a processing device for use in implementing the steps of the methods described herein.

FIG. 2 shows an exemplary block diagram of a processing device 103. The processing device 103 comprises a microprocessor 220 arranged to execute computer-readable instructions as may be provided to the processing device 103 via one or more of: a network interface 228 arranged to enable the microprocessor 220 to communicate with a communications network such as the internet; input/output means 222 which may be arranged, without limitation, to interface with: floppy disks, compact discs, USB sticks, one or more keyboards, and/or one or more computer mice; and a memory 224, for example a random access memory, that is arranged to be able to retrieve, store, and provide to the microprocessor 220, instructions and data that have been stored in the memory 224. The microprocessor 220 may further be coupled to a monitor 226 upon which a user interface may be displayed and further upon which the results of processing operations may be presented. The microprocessor 220 may also or alternatively communicate those results to another device via the network interface 228. In addition, the microprocessor 220 may comprise a Graphics Processing Unit (GPU—not shown), arranged to process images intended for display on the monitor, and which may also be used to execute parallel instructions at higher speeds than the microprocessor 220.

A method for use in estimating a pose of the imaged object 102 will now be explained with reference to FIG. 3, which shows an illustration of potential correspondences between an image and an atlas, and FIGS. 4 and 5, which show, in first and second consecutive parts, a flowchart of the steps of the method.

At step S100, an image 301 (or depth map) is received. The image represents, in three spatial dimensions, a scene including the imaged object 102 (which may be partially occluded due to another object, or objects, being in between the imaged object and the image acquiring device 101). The image 301 is made up of image elements, e.g., 305, 306, 307, and 308 which are in this case pixels, the respective intensities of which represent distances at the time of acquisition of the image 301 between the image acquiring device 101 and the various components of the scene.

At step S200, for each of at least a subset of the image elements, one or more corresponding candidate locations are identified in an atlas 315 of one or more candidate objects.

The atlas 315 of one or more candidate objects contains a representation of each candidate object. The representation of each candidate object may be a 2D image providing a three-dimensional representation of the object (such as a depth map or laser scan), a volumetric 3D representation of the object (such as a 3D array or volumetric image the elements of which having values indicative of presence or absence of the object and/or the surface of the object), or a geometric model of the object (for example as may be mathematically defined or determined using Computer-Aided Design (CAD) software).

Candidate locations are identified for each image element by deriving a descriptor associated with the respective image element, the descriptor representing the local geometry in the vicinity of that image element. The descriptor associated with the image element is matched to one or more descriptors associated with potential candidate locations in the atlas. When matching a descriptor associated with the image element to a descriptor associated with a candidate location, a matching score may be assigned, said score quantifying the similarity between the two descriptors.

As one possibility, for a number of predefined spatial positions around an image element, a descriptor is formed by listing those positions and creating a string (for example a binary occupancy string) wherein each element of the string corresponds to one of the listed positions and has a first value (i.e. a 1) if the image elements of the image indicate that that spatial position is behind the imaged scene or a second value (i.e. a 0) if the image elements of the image indicate that that spatial position is in front of the imaged scene. In practice, this may be achieved by working out a surface normal at a given image element based on adjacent image element values and then defining positions in relation to the normal—for example at a set distance centred upon the surface point and spaced apart by increments of 20 degrees. Potential candidate descriptors are also determined for the atlas in a corresponding manner.

As other possibilities, descriptors that use higher-order moments to describe local shape geometry could be used and/or descriptors designed for intensity images (e.g. SURF and shape context). These descriptors model local gradient statistics. Generally, descriptors can be described as vectors in $R^n$. The matching of two descriptors is performed by determining the Hamming distance between the two strings, and determining that the Hamming distance is below a threshold. The Hamming distance may directly be used as a matching score. As other possibilities, (normalized) cross correlation, and/or the squared or non-squared Euclidean distance may be used to compare descriptors.

Figure 3:
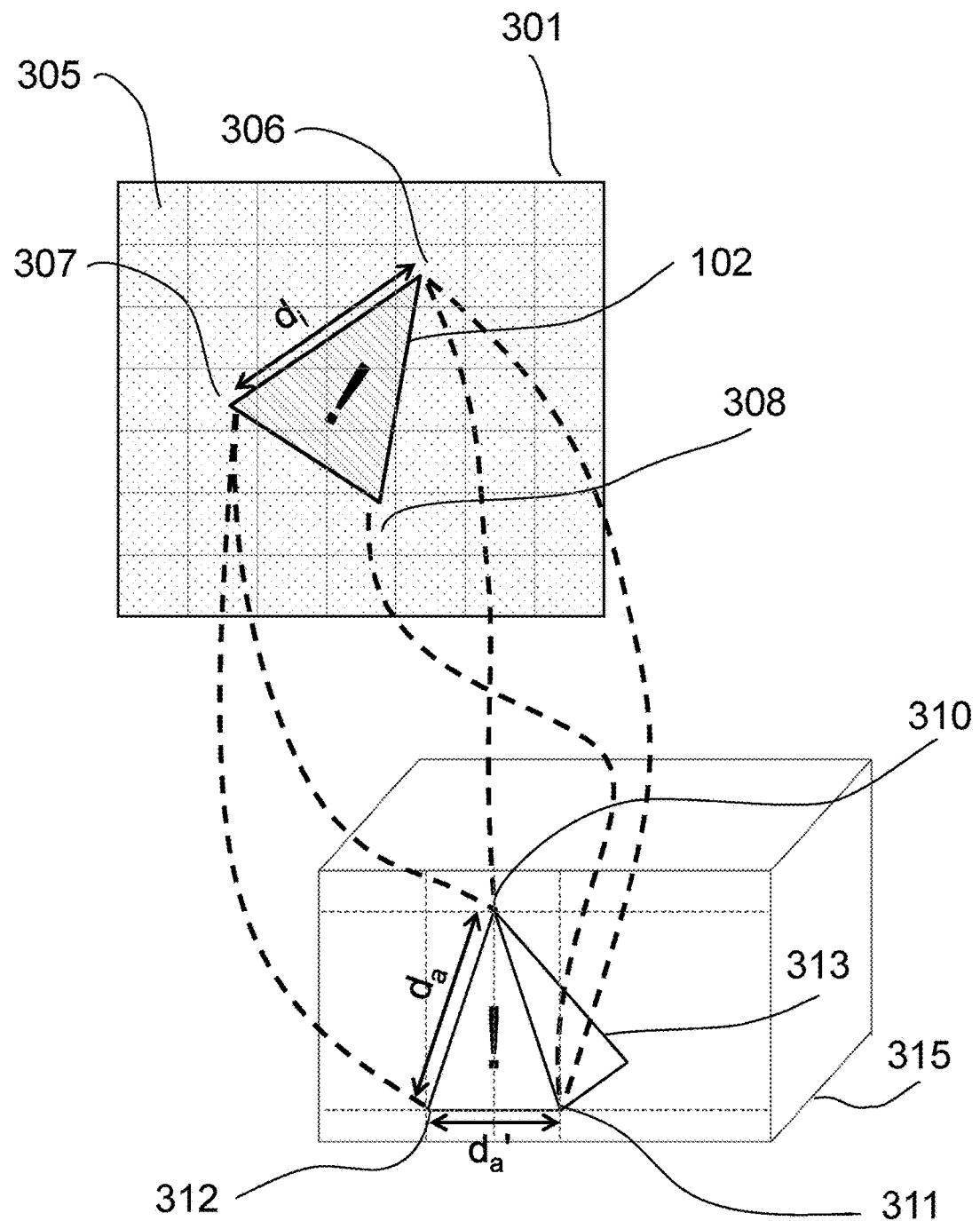
FIG. 3 shows an illustration of potential correspondences between an image and an atlas.

In the example of FIG. 3, for image element 306, two candidate locations 310, 311 on a candidate object 313 are identified as corresponding to image element 306; for image element 307, two candidate locations 310, 312 on the candidate object 313 are identified as corresponding to image element 307; and for image element 308, candidate location 311 on the candidate object 313 is identified as corresponding to image element 308.

At step S300, at least one pair of image elements (306, 307) is formed/selected from the image elements for which step S200 has been performed. As at least one corresponding candidate location will have been identified for each of the image elements for which step S200 has been performed, for each pair of image elements, at least two (a pair of) corresponding candidate locations will have been identified in step S200. For example, for the pair of image elements (306,307), the pair of corresponding candidate locations (310,312) and also the pair of corresponding candidate locations (311,312) will have been identified.

At step S400, for each of the pairs of image elements, a distance between the image elements forming that pair is determined. For example, a distance $d_i$ between a first image element 306 and a second image element 307 is determined. In the case where the image is a depth map, distances (in image space) between pairs of image elements are determined by back-projecting the image elements using the depth information contained in the image 301.

At step S500, distances (in atlas space) between each of the pairs of candidate locations are calculated. For example, as the pair of candidate locations (310,312) correspond to the pair of image elements (306,307), a distance $d_a$ between a first candidate location 310 and a second candidate location 312 is determined, and a distance $d_a'$ between the pair of candidate locations (311,312) (which also correspond to the pair of image elements (306,307)) is determined.

At step S600, the distances between pairs of image elements in image space and between the corresponding pairs of candidate locations in atlas space are compared. For example, the distance $d_i$ between image elements 306 and 307 is compared with the distance $d_a$ between corresponding candidate locations 310 and 312, and the distance $d_i$ is also compared with the distance $d_a'$ between corresponding candidate locations 311 and 312.

If the distance between a pair of image elements and the distance between a pair of corresponding candidate locations are dissimilar, then the pair of candidate locations is not likely to actually correspond to the pair of image elements, and a low compatibility score may be assigned to the pair of corresponding candidate locations. For example, candidate locations 311 and 312 are less likely to correspond to image elements 306 and 307 than candidate locations 310 and 312, as distance $d_a'$ is further from $d_i$ than $d_a$ is.

As a result of the comparison of step S600, a pairwise compatibility score is assigned to each of the pairs of corresponding candidate locations. As one possibility, the pairwise compatibility score may be the difference between the image space distance and the atlas space distance or may be derived therefrom.

Steps S300 to S600 of the above-described method are performed for at least two different pairs of image elements and steps S300-S600 for any of those pairs of image elements steps may be performed in parallel, sequentially, or a mixture thereof with steps S300-S600 of any other of the pairs of image elements. An effect of this is to easily enable the approach to be performed in parallel and therefore quickly.

Figure 4:
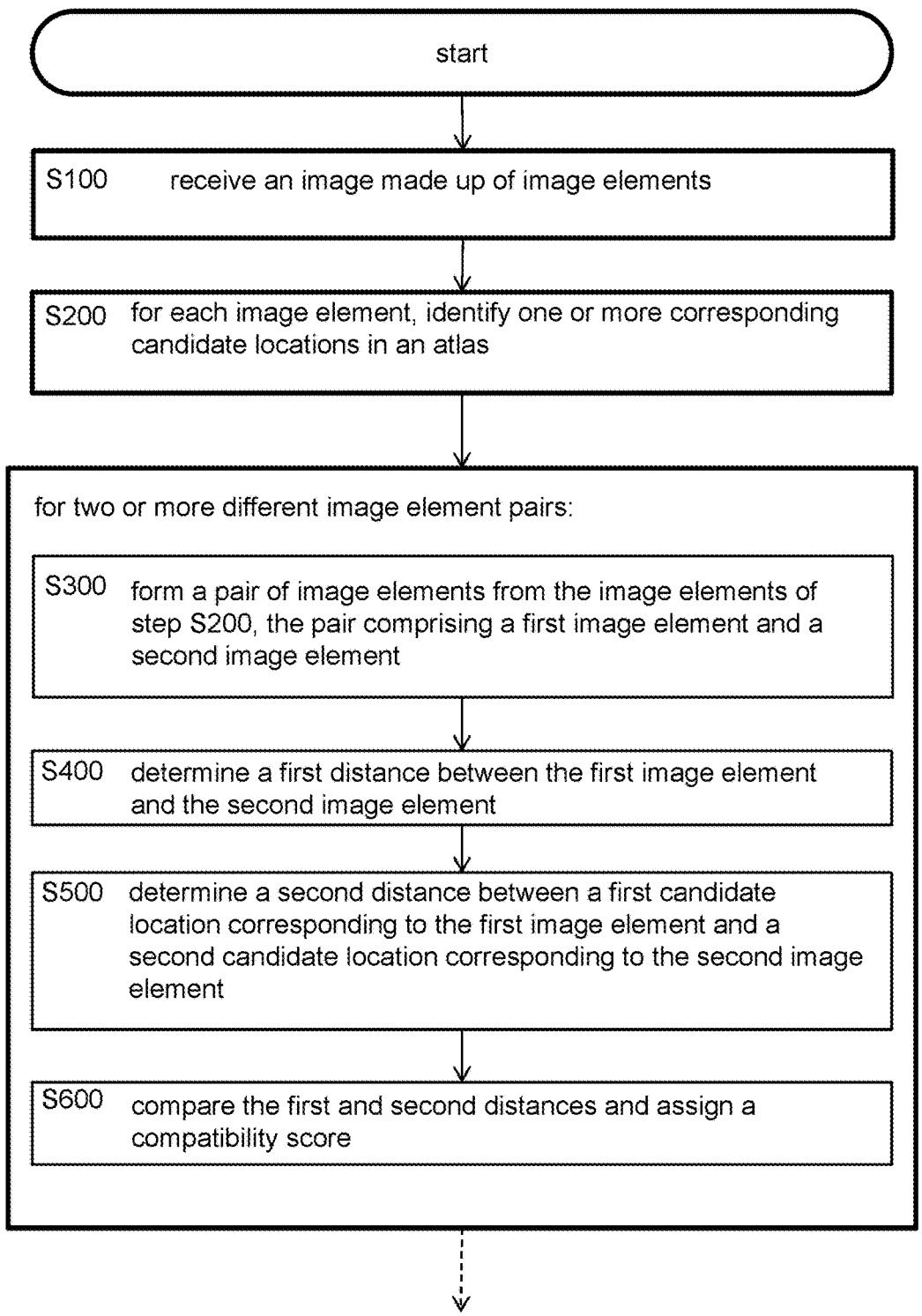
FIGS. 4 and 5 show, in two consecutive parts, a flow chart of the steps of a method described herein.
Figure 5:
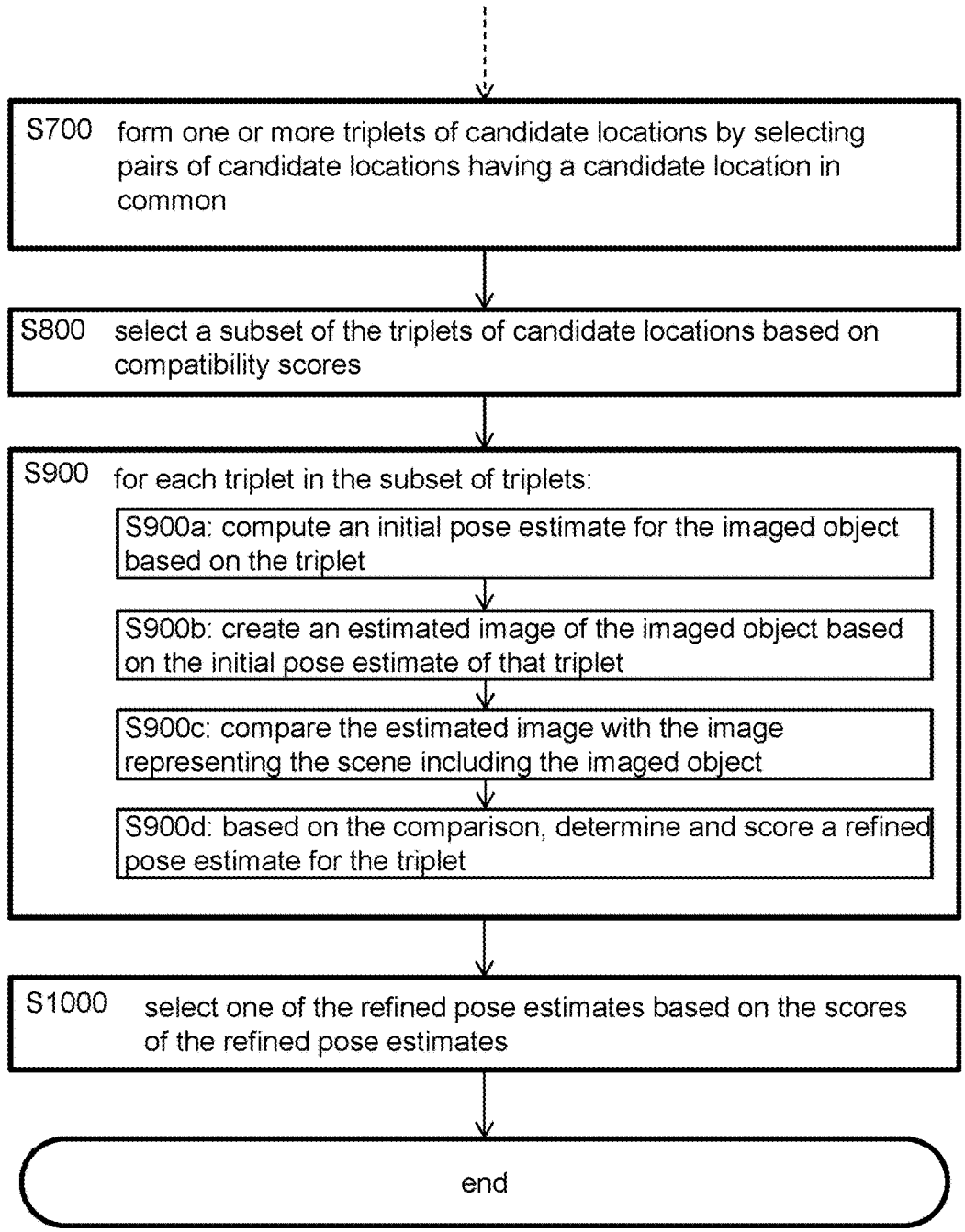

The flowchart of FIG. 4 continues from step S600 to step S700 of FIG. 5. The optional steps outlined in FIG. 5 enable a pose estimate to be determined from the compatibility scores of step S600.

At step S700, at least one triplet of candidate locations is formed by selecting two pairs of candidate locations that have a candidate location in common. For example, a triplet of candidate locations (310,311,312) may be formed from a first pair of candidate locations (310,312) corresponding to the pair of image elements (306,307) and from a second pair of candidate locations (310,311) corresponding to the pair of image elements (306,308). Preferably, a triplet will not be selected if the three candidate locations that constitute it lie on a straight line (i.e. are collinear) as such a triplet would not enable reliable pose determination.

At step S800, a subset of triplets of candidate locations is selected from the at least one triplet of candidate locations based on the compatibility scores of the pairs of candidate locations of each triplet, and optionally also based on the matching scores of the individual candidate locations forming of each triplet. For example, the compatibility scores of the two pairs of candidate locations that make up a given triplet could be added so as to give an overall compatibility score for that triplet. The triplets are then ranked according to their compatibility scores and/or matching scores, and a subset of the triplets is selected based on the ranking. As one example, a belief propagation approach is used to score a whole configuration of predicted matches based on the scores for the parts (matching scores and compatibility ones).

At step S900, for each triplet in the subset of triplets, steps S900a to S900d are performed. As a triplet of non-collinear points is sufficient to uniquely define the spatial pose of a candidate object, at step S900a, an initial pose estimate (for example a rigid transformation matrix) for the imaged object 102 is computed based on the triplet. At step S900b, the candidate object 313 (as defined by the atlas 315) is transformed by the initial pose estimate and the transformed candidate object is used to create an estimated image representative of an image of the imaged object that would be acquired by the image-acquiring device 101 if the candidate object had a pose equivalent to the initial pose estimate.

At step S900c, the estimated image is compared to the image 301 representing the scene including the imaged object 102 so as to produce a score for that estimated image. Comparison may be by way of evaluation of a similarity measure such as: Sum of Squared Differences, Cross Correlation, Normalised Mutual Information, etc.

At step S900d, a refined pose estimate for the triplet, based on the comparison of step S900c, is determined. As one example, a searching approach is employed by repeatedly varying the initial pose estimate and determining whether an evaluation of an estimated image that is created according to the varied pose estimate is better or worse than a previous such evaluation for that triplet.

At step S1000, one of the refined pose estimates is selected, based on the scores of the refined pose estimates, as being representative of the true pose of the object. The selected refined pose estimate can then be used in a variety of applications.

Examples of the described approaches are set out in the below list of numbered clauses:
1. A method of recognizing and estimating the pose of an object given a single depth image of a scene depicting the object.
2. A method that quickly discards incorrect detections of the object by using pairwise compatibility between predictions and depth data.
3. A method to rank object and pose predictions using inference via local message passing (belief propagation).
4. A method to efficiently sample promising sets of putative correspondences.
5. A method that estimates an object's pose by detecting parts of the object in order to handle occlusions.

There is described herein a method for use in estimating a pose of an imaged object that comprises identifying candidate elements of an atlas that correspond to pixels in an image of the object, forming pairs of candidate elements, and comparing the distance between the members of each pair and with the distance between the corresponding pixels.

As one possibility, the approach described with reference to FIGS. 4 and 5 may perform steps S300 to S600 for only a single pair of image elements so as to enable a determination of the suitability of candidate locations based on distance comparisons for the first and second image elements of that pair of image elements.

Although only three correspondences between image elements and candidate locations are necessary in order to determine a pose estimate, the approaches described herein need not be limited to triplets of candidate locations for example the triplets of candidate locations may be replaced with sets of candidate locations comprising more than two pairs of candidate locations—preferably having one candidate location in common.

Although the image 301 may be received directly from an image-acquiring device 101, the image 301 may have been obtained by downsampling an image obtained from an image-acquiring device 101 so as to reduce its resolution and thereby reduce the computational complexity of the approaches disclosed herein.

Approaches described herein may be implemented without using colour information (e.g., RGB information) relating to the imaged object 102, and may be performed based only on an image 301 of an imaged object along with an atlas.

Potential applications of the approaches described herein include: robotic arms and autonomous robots (for example, for: the recognition of objects purely based on 3D geometry, the autonomous grasping of objects, and/or autonomous assembly); self-localization from depth images (for example by recognizing specific objects in the scene); automated infrastructure inspection (for example by comparing a detected object with the geometry stored in a 3D database); obstacle/hazardous object avoidance (for example by recognizing dangerous objects); 3D gesture recognition (for example by recognizing hand templates in different poses); rapid 3D modelling (for example by recognizing 3D building blocks (pipes, cubes, boxes) and storing geometric relationships between them—which can be used to modify the virtual object later).

The approaches described here quickly filter random samples (i.e. image elements) that are contaminated by outliers via message passing. The approaches take into account that objects projected into images constitute a contiguous region in the image, therefore using matches from spatially close pixels in the depth image is beneficial. Due to the large number of outliers among the hypothesized matches (the corresponding candidate locations), random sampling of the required 3 correct matches to determine the objects pose would be ineffective. The approaches therefore break down the generation of promising sample sets containing 3 putative correspondences into several steps:

For each pixel a set of putative correspondences (corresponding candidate locations) to surface points on the object ("object coordinates") are stored, which are determined based on local depth appearance.

For two pixels (i.e. an edge) in a local neighbourhood a pairwise compatibility between predictions is computed. For any sample set that contains predictions from this edge the likelihood of this sample being contaminated by outliers can be computed by message computation and is available in the next step.

All triplets of 3 nearby pixels in the depth image are considered as sample set, and initially ranked and discarded based on the computed messages. The top-ranked sample sets are evaluated using a more expensive geometric fitting energy.

The approaches described herein have been found to work with objects that have a non-discriminative 3d shape. Furthermore, the approaches do not need RGB images in addition to depth data, and they can be easily implemented in data-parallel architectures (multi-core CPUs, GPUs), enabling real-time object recognition and pose estimation.

The approaches described herein may be implemented on any computer and may be embodied in any appropriate form including hardware, firmware, and/or software, for example on a computer readable medium, which may be a non-transitory computer readable medium. The computer readable medium carrying computer readable instructions arranged for execution upon a processor so as to make the processor carry out any or all of the methods described herein.

The term computer readable medium as used herein refers to any medium that stores data and/or instructions for causing a processor to operate in a specific manner. Such a storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, any other magnetic data storage medium, a CD-ROM, any other optical data storage medium, any physical medium with one or more patterns of holes or protrusions, a RAM, a PROM, an EPROM, a FLASH-EPROM, NVRAM, and any other memory chip or cartridge.

Detailed examples of the approaches described herein are set out below.

Object Pose Recognition

Joint object recognition and pose estimation solely from range images is an important task e.g. in robotics applications and in automated manufacturing environments. The lack of colour information and limitations of current commodity depth sensors make this task a challenging computer vision problem, and a standard random sampling based approach is time-consuming. This difficult problem may be addressed by generating promising inlier sets for pose estimation by early rejection of clear outliers with the help of local belief propagation (or dynamic programming). By exploiting data-parallelism the approach is fast, and a computationally expensive training phase is not necessary. State-of-the art performance is demonstrated on a standard dataset.

In contrast to colour images, depth maps are usually far less discriminative in their appearance particularly for local depth image patches. A sensible and simple prior for depth images is given by a piecewise smooth regularizer. Consequently, interest point detection in depth images is not necessary and features are evaluated densely (or quasi-densely by subsampling) in the query image. Further, real depth sensors exhibit several shortcomings at depth discontinuities, such as half-occlusions and foreground fattening occurring with triangulation-based sensors (passive stereo or Kinect-type active stereo), and mixed pixels with time-of-flight sensors. Overall, many depth sensing technologies report reliable and accurate depth values only in smooth regions of the true scene geometry. Beside that, the piecewise smooth appearance of range images also implies that extracting a full 3D local coordinate frame is not repeatable, but at least estimating surface normals is rather reliable. Thus, feature extraction can be easily made invariant with respect to two degrees of freedom (i.e. the surface normal) but not reliably invariant with respect to the remaining 2D rotation in the local tangent plane. For the same reason, predicting poses directly based on feature correspondences may lead to large uncertainties in the estimates, and therefore the approach described herein predicts "object coordinates" (i.e. 3D vertices on the object of interest) and computes more certain and accurate poses from multiple correspondences.

Finally, objects of interest can be occluded and only be partially visible. A sensible principle to add robustness with respect to occlusions is to employ a compositional method, i.e. to detect the object and estimate its pose by detecting and aligning smaller parts. Due to the locally ambiguous appearance of depth images, a much higher false-positive rate may be expected than with colour images when matching features extracted in the query images with the ones in the training database, and it will be useful to maintain several predictions of object coordinates per pixel to address the amount of false positive matches. In summary, object detection solely from depth data faces the following challenges: (i) few salient regions in range images, (ii) unreliable depth discontinuities, and (iii) uninformative features and descriptors.

Since depth cameras report 3D geometry, and approaches described herein are based on predicting 3D object coordinates for pixels in the range image, the internal consistency of putative object coordinates may be assessed by comparing the distance between two observed 3D points (back-projected from the depth map) and the one between predicted object coordinates. Grossly deviating distances indicate that at least one of the predicted object coordinates may be an outlier. Thus, one can easily avoid sampling and evaluating pose hypotheses from outlier-contaminated minimal sample sets by scoring this (pairwise) consistency between predictions and observed data.

The inventor has arrived at the insight that if one interprets the object coordinate hypotheses per pixel as unknown (or latent) states, then the pairwise consistency of predicted object coordinates plays the role of pairwise potentials in a graphical model, and that, consequently, the methodology of inference in graphical models may be employed in this setting in order to rank sets of putative object coordinates by computing respective min-marginals. In contrast to other uses of graphical models with respect to images, where a random field is defined over the entire image, approaches described herein utilises many but extremely simple graphical models whose underlying graph has exactly the size of the required minimal sample set.

Robust geometric estimation is typically addressed by data-driven random sampling in computer vision. A standard top-down RANSAC-type approach for rigid object pose estimation would randomly draw three object coordinate hypotheses (not necessarily using a uniform distribution) and evaluate the induced pose with respect to the given data. On a high level view RANSAC generates a large number of pose hypotheses and subsequently ranks these. Approaches described herein can be employed in a bottom-up manner, that is, by reversing the direction of computation so as to consider a large number of overlapping minimal sample sets and remove the ones clearly contaminated with outliers by utilizing the consistency criterion. Since the minimal sets are overlapping, applying the consistency criterion to a pair of putative correspondences enables several minimal sample sets to be discarded at once. This is an elegant solution to generate promising sample sets for robust (pose) estimation in images exhibiting very few inlier correspondences.

Figure 6:
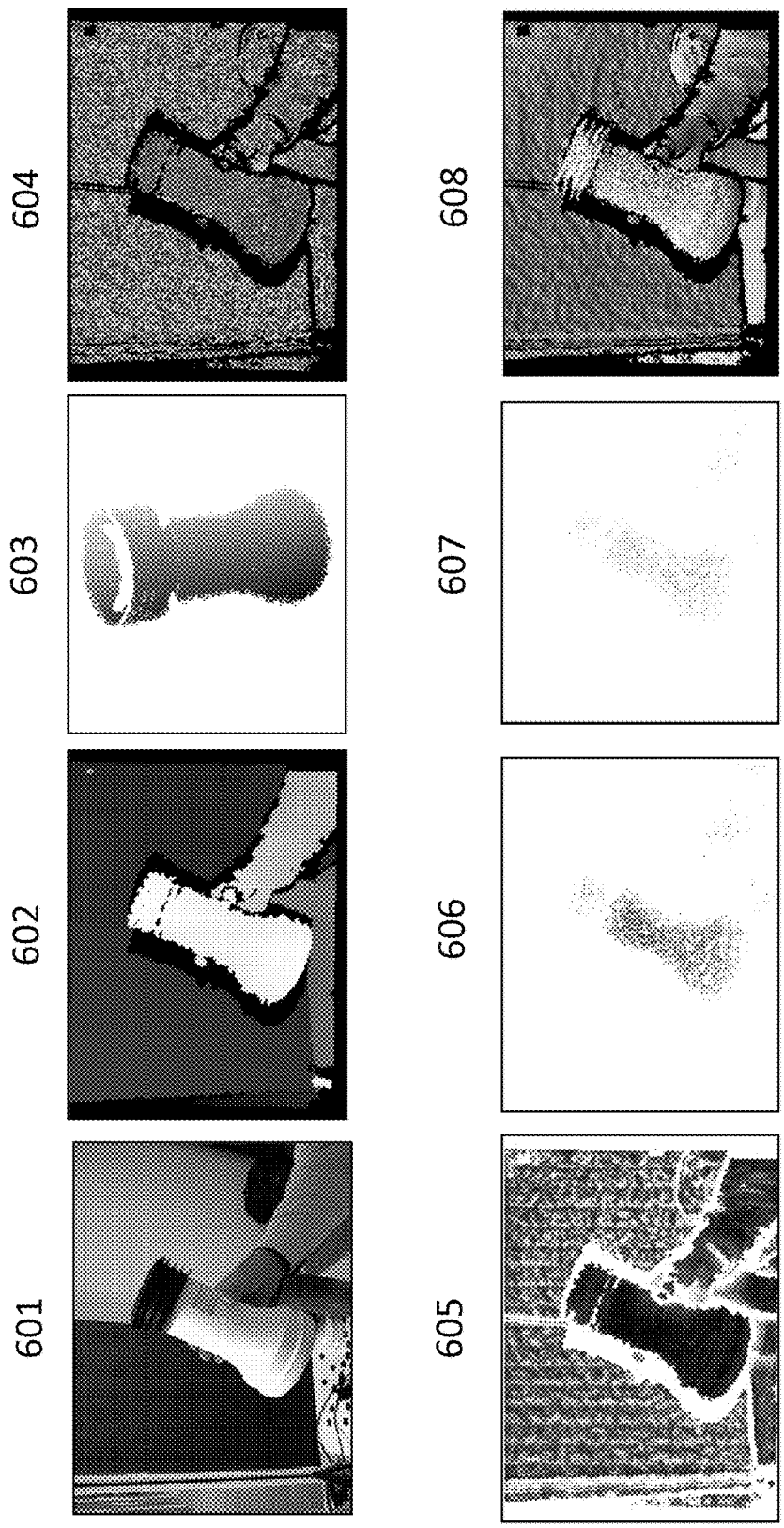
FIG. 6 shows exemplary results of a method described herein.

FIG. 6 shows exemplary results of the steps of a method described herein. Image 601 is an input RGB image (for illustration purposes only); image 602 is an input depth image; image 603 is a view of a trained CAD model (an atlas) with grayscale-coded object coordinates; image 604 shows the best matching object coordinates for the input to illustrate the level of false positives; image 605 shows the corresponding minimal feature distances, which also serve as unary potentials (matching scores) in Eq. 4; image 606 shows the smallest min-marginals Eq. 6 per pixel; image 607 shows the geometric pose scores (Eq. 11) after pose refinement; and image 608 shows points of the model superimposed according to the best pose estimate.

In the below it is shown that the approaches described herein are capable of handling noisy sensor data while performing at several frames per second. Another challenging aspect is handling objects with highly self-similar local shape appearance (e.g. surfaces of revolution or objects with multiple symmetries).

Before a method is described in detail, a high-level overview is provided: at test time the algorithm maintains a set of putative matching object coordinates (corresponding candidate locations) for each pixel (image element) in the test image (image 301). Instead of sampling minimal sets of correspondences required for (rigid) pose computation, the utility of pairs of correspondences (pairs of candidate locations) is assessed by using the consistency with the observed depth data. Triplets of correspondences (triplets of candidate locations) are ranked, and finally promising ones are evaluated using a standard geometric criterion to determine the best-scoring object pose.

Descriptor Computation

Given the nature of depth maps and the problem of detecting objects that occupy only a fraction of the image, a dense (or quasi-dense) computation of descriptors may be used in order not to rely on unstable salient feature points.

The descriptor to represent (local) geometry is based on an implicit volumetric representation of range images (depth maps) and 3D surface meshes. As one possibility, a binary occupancy grid is employed to compute descriptors. Other options include: a (truncated) signed distance function (TSDF), and 3D-SURF. The descriptor in the method described herein is a bit string of occupancies in the vicinity of a surface point.

In order to obtain some degree of invariance with respect to viewpoint changes, the z-axis of the local coordinate frame at a surface point is aligned with the (local) surface normal. Given the piecewise smooth characteristic of range images, normals can be estimated relatively reliably for most pixels (after running a Wiener filter to reduce the quantization artifacts observed in triangulation-based depth sensors). For the same reason computation of the second principal direction is highly unreliable and not repeatable. Therefore several descriptors are computed at each surface point by sampling the 2D rotation in the tangential plane (as one example, samples are taken in 20° steps resulting in 18 descriptors per surface point.

Instead of storing a full local occupancy grid (centered at a surface point), a subset of voxels are used (512 in the implementation described below, i.e. the descriptors are 512 bits long). By running feature selection on example training data, it was observed that only voxel positions near the tangent plane are selected. Thus, voxel positions were randomly sampled in a box aligned with the tangent plane that has half the height of the width and depth (8 cm×8 cm×4 cm boxes were used). This means that building the descriptors from the given depth images or training meshes is very fast.

Matching

At test time descriptors are computed for each pixel with valid depth and estimated surface normal in the (sub-sampled) depth image, and the task is to efficiently determine the set of object coordinates with similar local shape appearance. To quantify similarity of binary strings, the Hamming distance is used. An approximated nearest neighbours implementation for binary data in FLANN was used.

Pairwise Compatibility

The matching step returns a list of object coordinate candidates (candidate locations) for each pixel (image element) with attached descriptors. Even without generating a pose hypothesis it is possible to assess the quality of pairs of putative correspondences (pairs of candidate locations) by exploiting the information contained in the range image (image 301). If p and q are two pixels (image elements) in the query range image, and $\hat{X}_p$ and $\hat{X}_q$ are the respective back-projected 3D points induced by the observed depth, $X_p$ and $X_q$ are putative correspondences reported at p and q, then a necessary condition for $\hat{X}_p \leftrightarrow X_p$, $\hat{X}_q \leftrightarrow X_q$ being inlier correspondences is that $$\|\hat{X}_p - \hat{X}_q\| \approx \|X_p - X_q\|. \quad (1)$$

If the Euclidean distance between $\hat{X}_p$ and $\hat{X}_q$ deviates substantially from the one between $X_p$ and $X_q$, then $X_p$ and $X_q$ cannot be part of an inlier set. The exact quantification of "sufficiently large" deviations depends on the depth sensor characteristics. Note that this criterion is invariant to any hypothesized pose. It can be made stronger (more discriminative) by adding the compatibility of normal estimates. In order not to introduce extra tuning parameters of how to weight the distance and normal compatibility terms, methods described herein focus on the distance based compatibility of predicted object coordinates. The loss of discrimination power by excluding normal compatibility has minimal impact on the results, since the final compatibility scores are based on triplets of correspondences (triplets of candidate locations) as described below. Thus, a scoring function (compatibility score) to assess the compatibility between correspondences $X_p \leftrightarrow \hat{X}_p$ and $X_q \leftrightarrow \hat{X}_q$ (which will play the role of pairwise potentials in the following) is given by $$\psi(X_p, X_q; \hat{X}_p, \hat{X}_q) \overset{def}{=} \quad (2)$$

$$\begin{cases} \Delta^2(X_p, X_q; \hat{X}_p, \hat{X}_q) & \text{if } |\Delta(X_p, X_q; \hat{X}_p, \hat{X}_q)| \leq \sigma \\ \infty & \text{otherwise} \end{cases} \quad (3)$$

with $$\Delta(X_p, X_q; \hat{X}_p, \hat{X}_q) \overset{def}{=} \|\hat{X}_p - \hat{X}_q\| - \|X_p - X_q\|.$$

σ is the maximum noise or uncertainty level expected from the depth sensor and matching procedure. Since the training data is densely sampled, the value of σ does not need to reflect the surface sampling density of training meshes. σ was set to in the below experiments.

Minimal Sample Set Generation

Rigid pose estimation requires at least three (non-degenerate) point-to-point correspondences. Given three such correspondences, e.g. $\{\hat{X}_p \leftrightarrow X_p, \hat{X}_q \leftrightarrow X_q, \hat{X}_r \leftrightarrow X_r\}$, a Euclidean transformation and therefore pose estimate can be computed via the Kabsch algorithm or Horn's method. The task at hand is to generate a promising set of three correspondences from the candidate object coordinates determined for each pixel.

Randomly sampling three putative correspondences will be inefficient, since the inlier ratio is very small as illustrated in the following example: if the object of interest (imaged object 102) is seen in about 5% of the image pixels, and 10 putative correspondences are maintained per pixel (and contain a true positive for each pixel covered by the object), the inlier ratio is 0.5%, and naive RANSAC sampling at a 95% confidence level will require more than 20 million iterations. This value is only a coarse estimate, since it is too pessimistic (e.g. by assuming a naive sampling over the full image instead of a more sophisticated sampling strategy) and too optimistic (by assuming pixels seeing the object have always a true positive correspondence) at the same time. Nevertheless, almost all random minimal sample sets will contain at least one outlier, and the pairwise compatibility criterion described below efficiently determines promising sample sets.

To this end min-marginals are computed via max-product Belief Propagation (BP) on a tree (which is actually min-sum BP since negative logpotentials are used) to quickly discard outlier contaminated sample sets. Let {p, q, r} be a set of (non-collinear) pixels in the query image, let $X_s$, $s \in \{p, q, r\}$ range over the putative object coordinates, and $\phi_s(X_s)$ be a unary potential (usually based on the descriptor similarity), then the negative log-likelihood (energy) of states $(X_p, X_q, X_r)$ according to the graphical model is $$E_{pqr}(X_p, X_q, X_r) \stackrel{def}{=} \quad (4)$$
$$\phi_p(X_p) + \phi_q(X_q) + \phi_r(X_r) + \psi(X_p, X_q; \hat{X}_p, \hat{X}_q) + \psi(X_p, X_r; \hat{X}_p, \hat{X}_r).$$

The Hamming distance between the descriptor extracted at pixel s and the ones returned by the (approximate) nearest neighbour search for $X_s$ is used as unary potential $\phi_s(X_s)$.

Note that min-marginals, i.e. the quantities $$\mu_{pqr}(X_p) \stackrel{def}{=} \min_{X_q, X_r} E_{pqr}(X_p, X_q, X_r) \quad (5)$$

for each $X_p$ can be computed via the bottom-up pass of belief propagation on a tree rooted p. In this case only 3 correspondences are needed to determine a pose estimate, and therefore the tree degenerates to a chain. If the minimum sample size is larger—e.g. when computing the pose of an object subject to low-parametric and (approximately) isometric deformations—a generalization of the underlying graph is a star graph.

The relevant values computed during BP are the upward messages $$m_{q \to q}(X_p) = \min_{X_q} \{\phi_q(X_q) + \psi(X_p, X_q; \hat{X}_p, \hat{X}_q)\} \quad (5)$$

sent from a leaf q to the root p. Note that the min-marginals can be expressed as $$\mu_{pqr}(X_p) = \min_{X_q, X_r} E_{pqr}(X_p, X_q, X_r) \quad (6)$$
$$= \phi_p(X_p) + m_{q \to p}(X_p) + m_{r \to p}(X_p)$$

Further, observe that the vector of messages $$m_{q \to p} \stackrel{def}{=} (m_{q \to p}(X_p))_{X_p}$$

can be reused in all trees containing the (directed) edge q→p, leading to substantial computational savings. For certain pairwise potentials ψ the message vector computation is sub-quadratic in the number of states (i.e. putative object coordinates in this setting), which would lead to further computational benefits. Unfortunately the choice of the pairwise potential given in Eq. 3 does not allow an obvious faster algorithm for message computation. Message computation does not only yield the value of the messages, $m_{q \to q}(X_p)$, but also the minimizing state $$X^*_{q \to p}(X_p) \stackrel{def}{=} \arg\min_{X_q} \{\phi_q(X_q) + \psi(X_p, X_q; \hat{X}_p, \hat{X}_q)\} \quad (7)$$

which is used to quickly determine the optimal object coordinate predictions at pixels q and r given a prediction $X_p$ at pixel p. Computation of the min-marginals $\mu_{pqr}(X_r)$ does not take into account the third edge potential between pixel q and r, $\omega(X_q, X_r; \hat{X}_q, \hat{X}_r)$. Adding this edge to the energy Eq. 4 would require message passing over triple cliques, which is computationally costly. [Message passing would be cubic in the number of states in such setting.]

The min-marginals are computed densely for each pixel in the query image (i.e. every pixel is the root), and messages $m_{p+\delta_k \to p}$ are computed from pixel located at an offset $\delta_k$, $k \in \{1, \ldots, K\}$ from p. The choice of the set $\{\delta_k\}$ contains the 16 offsets of axis aligned and diagonal offsets at 8 and 16 pixels distance (which aims to trade off locality of predictions and numerical stability of pose estimation). For two edges q→P and r→P the predictions $(X_p, X^*_{q \to p}(X_p), X^*_{r \to p}(X_p))$ form a minimal sample set for estimating the rigid pose, and min-marginals are for all K(K−1)/2 such triplets used to rank these minimal sample sets. The method proceeds with estimating and evaluating the pose for the top ranked ones (here, 2000 are used) as described below.

Pose Hypotheses Evaluation

Assessing the quality of a pose hypothesis by aligning the 3D model with the range image appears to be straightforward—if the poses are affected by no or minimal noise. A substantial noise level can be expected in the pose hypotheses, and a sensible scoring function to rank the poses needs to take this into account. To this end a scoring function needs to be invariant to pose uncertainties. Since the true pose is effectively a latent variable, one option is to marginalize (i.e. average) over nearby poses [which essentially amounts to smoothing the input] and another is to maximize over the latent pose. In the below, the latter option is chosen. Since it is not expected or assumed that many pose hypotheses will be obtained near the true pose, no pose clustering or averaging approaches are used. A, "classical" geometric approach is used by determining an optimal alignment between the given 3D model points and the depth map.

A way to assess the quality of a hypothesized pose (or any latent variable in general) is to "explain" the data given the assumptions on the sensor noise, i.e. to formulate a respective cost function that sums (integrates) over the image domain. Unfortunately, this more principled formulation is expensive to optimize. Thus, for computational reasons, the reverse direction of "explaining" the model is used (recall that up to 2000 pose hypotheses are considered at this stage). Several methods to robustly refine the pose of a point set with respect to a depth map were implemented, including pose refinement via (robust) non-linear least squares. The following simple alternation algorithm is efficient and effective:

1. Perform "projective data association" (i.e. establish the correspondence between a model point $X_j$ and the back-projected depth $\hat{X}_j$ with both $\hat{X}_j$ and $RX_j+T$ being on the same line-of-sight),
2. and update R and T using a weighted extension of the Kabsch algorithm (also known as Wahba's problem). The weights $w_j$ are derived from the smooth approximation of the robust truncated quadratic kernel $$\rho_\tau(e) \stackrel{def}{=} \begin{cases} \frac{e^2}{4}\left(2 - \frac{e^2}{\tau^2}\right) & \text{if } e^2 \leq \tau^2 \\ \frac{\tau^2}{4} & \text{otherwise} \end{cases} \quad (8)$$

$$\omega_\tau(e) \stackrel{def}{=} \rho'_\tau(e)/e = \max\{0, 1 - e^2/\tau^2\}, \quad (9)$$

and given by $$w_j = w_T((RX_j+T-\hat{X}_j)_3) \tag{10}$$

The weights given in Eq. 10 are based on depth deviation between the transformed model point and the corresponding value in the depth map. If a depth value is missing for the projected model point, that correspondence is considered an outlier and has zero weight. is the inlier noise level and the same value is used as for (which is 3 mm). It should be noted that this algorithm does not optimize a single energy (a property shared with most ICP variants using projective data association). These two steps are repeated 10 times on a (random) subset of 1000 model points. The final score of the pose hypothesis is evaluated on a larger subset of 10000 model points by using a robust fitting cost, $$\sum_j \rho_\tau((RX_j+T-\hat{X}_j)_3) \tag{11}$$

The pose with the lowest cost is reported and visualized.

Implementation Notes

Training phase: The core data used in the training stage are depth images of the object(s) of interest (imaged object) together with the respective pose data. These depth maps can be generated synthetically from e.g. CAD models or captured by a depth sensor. If CAD models are rendered, the camera poses are generated randomly looking towards the object's centre of gravity. In the implementation, the real depth sensor characteristics (e.g. noise or quantization effects) are not simulated, which in some cases led to missed correspondences in parts of the object (e.g. the top of the pipe in FIG. 6 has a substantially different appearance in rendered and real depth maps). From these depth maps a target number of descriptors (typically 32 k in these experiments) are extracted by selecting a random subset of (valid) pixels in the depth map. Random sampling is slightly biased towards pixels in the depth map with close to fronto-parallel surface patches. Thus, about 600 k descriptors (32 k×18 for the sampled tangent-plane rotations) are generated and stored. No further processing takes part at training time. Consequently, the training phase is completed within seconds.

Parallel implementation: Most steps in approaches described herein can be parallelized (including descriptor extraction, matching against the database, message passing, and pose evaluation). While no part of the algorithm was implemented on a GPU, OpenMP-based multi-processing was used whenever possible. The input depth maps (image 301) are 640×480 pixels, but predicted object coordinates are computed on either 320×240 or 160×120 images (the latter one for to achieve interactive frame rates). On a dual Xeon E5-2690 system, a frame rate between 2 frames per second (320×240 resolution) or up to 10 Hz (160×120) was achieved. Nearest-neighbour descriptor matching is usually the most time consuming part. A GPU implementation is anticipated to have real-time performance.

Experiments

Results are shown on the Mian dataset, since it is the de facto baseline benchmark dataset for 3D object detection algorithms. The inventor's own datasets recorded with the ASUS Xtion camera are also shown in order to demonstrate the ability of the algorithm described herein to cope with noisy inputs. Since the algorithm described above takes depth maps as input, the given meshes were converted to range images by rendering into 640×480 depth maps using approximate parameters for the camera intrinsics (since the calibration parameters of the range scanner are not available). Consequently, the amount of occlusions in the depth maps may be slightly higher than in the provided meshes. We show as baseline methods the following approaches: Spin images, Tensor matching, Drost, SVS and Tuzel.

Figure 7:
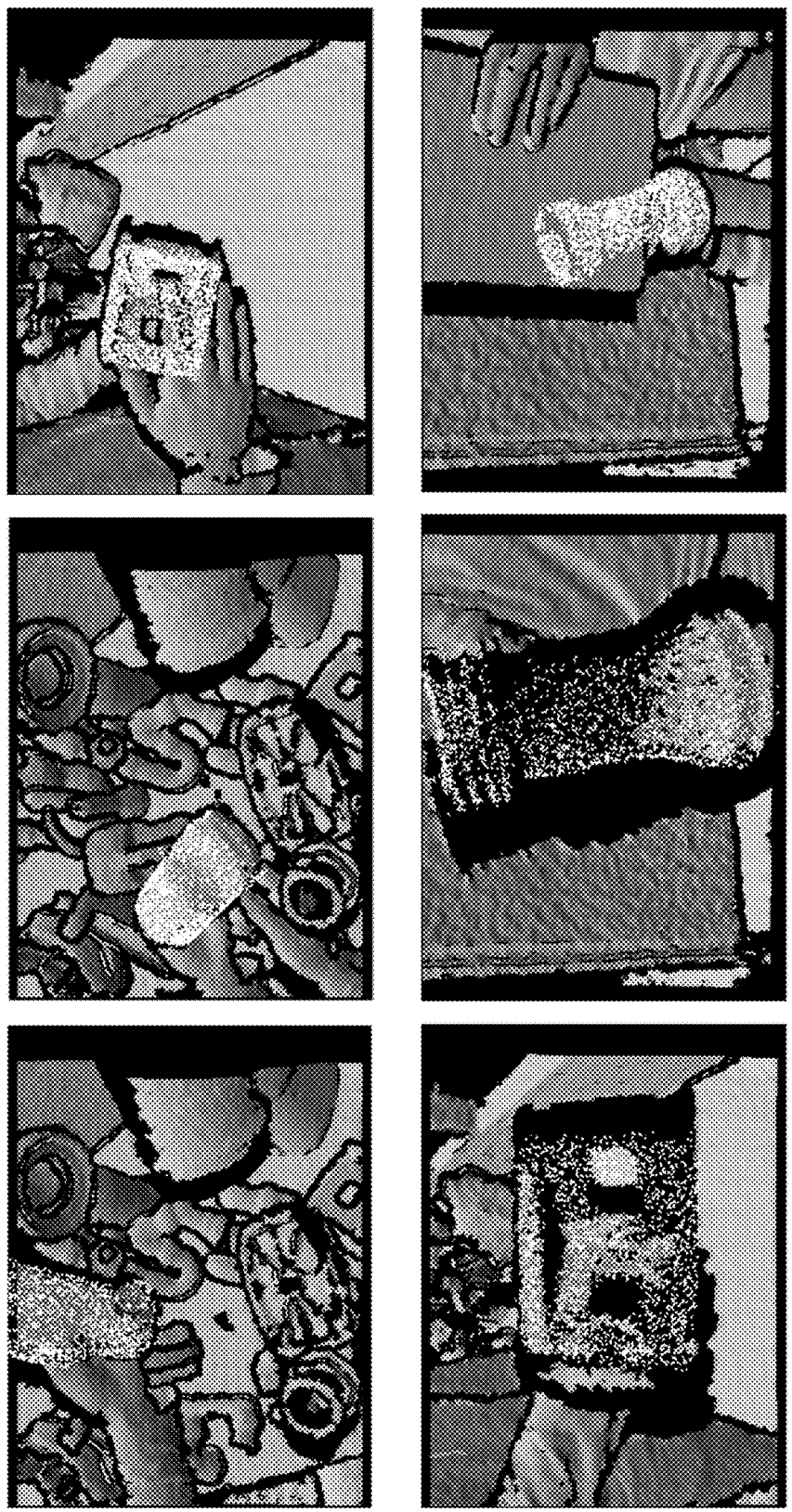
FIG. 7 shows further exemplary results of a method described herein.

FIG. 7 shows sample frames from the ASUS Xtion sequences. The respective model point cloud is superimposed on the normal-map rendered input. Correct detections and poses can be seen despite large occlusions, missing depth data, and strong viewpoint changes.

Figure 8:
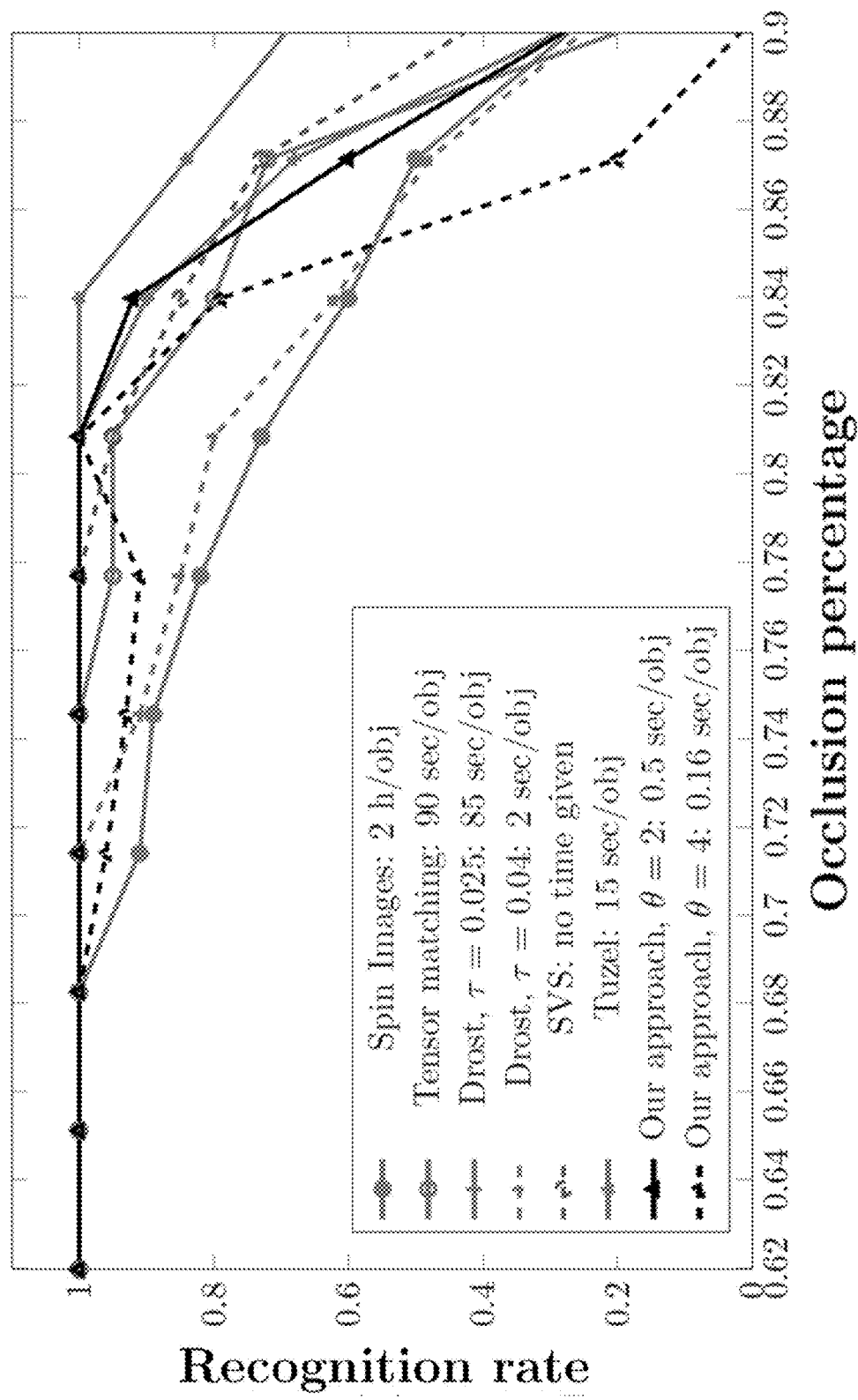
FIG. 8 shows performance results of a method described herein.

FIG. 8 shows results obtained on the Mian dataset. It can be seen that the method described herein is able to handle occlusions of up to 81% and still give 100% detection rates. It is also significant that the time required to detect a single object compared to the only other approaches that obtain similar or better detection rates, is of up to 30 times less for approaches described herein when compared with the Tuzel approach and up to 170 times less compared to the Drost approach.

Experimental setup: The Mian dataset contains 50 scenes with 4 models on which to perform detection.

Ground truth pose is provided for all instances of all objects. Apart from those 4 models, another model exists that was excluded in Mian's experiments; hence the approach described herein and all baselines do not include this object. Results are provided for two different resolutions for the prediction image, 320×240 (downsampling factor θ=2), and 160×120 (θ=4). A smaller resolution of the predicted object coordinate image means faster computation, but also a lower probability of finding an inlier sample set (and consequently returning a successful detection).

Experimental results: As seen in FIG. 8, approaches described herein are able to achieve 100% detection with up to 81% of occlusion, with higher levels of occlusion approaches described herein perform similarly to the best baselines. Learning techniques could likely be employed to boost the results of the approaches described herein (in terms of recognition rate and possibly in run-time).

The results on the Mian dataset give a clear understanding of how the approaches described herein performs, but at the same time the data is much cleaner than depth maps obtained by current commodity sensors. Consequently, the inventor recorded their own data using an ASUS Xtion depth sensor and ran a method described herein for objects with available CAD models (either obtained from a 3D model database, such as the toy car and the bracket, or by approximate manual 3D modeling of pipe-like structures). When creating the descriptors for the objects of interest, the depth sensor characteristics (such as boundary fattening and depth quantization) were not simulated. Thus, the 3D model to detect and the actual range images may be significantly different in their depth appearance. FIG. 7 depicts sample frames with the model point cloud superimposed on the input depth (rendered via its normal map).

Computation time: Results with a CPU implementation of an approach described herein are presented, although a GPU implementation for most steps in the algorithm is straightforward and is expected to yield real-time performance (20 Hz). The individual time contributions of the various stages of the method described herein are as follows:

Descriptors (descriptor computation): 9%;
Matching (Hamming distance based descriptor matching using FLANN): 45%;
Message passing (for min-marginal computation): 24%;
Ranking (ranking/sorting according to Eq. 6): 6%; and
Pose Evaluation (including ICP): 16%.

By far the most expensive step is the feature matching step. The exact values vary depending on the input frame and the object of interest, but in general feature matching (i.e. nearest neighbour search) consumes a dominant fraction of the overall frame time. The matching time is typically faster for object with a highly distinctive local shape appearances than for object with redundant surface structures, since in the former case the search trees tend to be more balanced.

The invention claimed is:

1. A computer implemented method for use in estimating a pose of an imaged object, the method comprising the following steps:
    a) receiving an image made up of image elements, the image representing, in three spatial dimensions, a scene including the imaged object;
    b) for each of a plurality of the image elements, identifying one or more corresponding candidate locations in an atlas of one or more candidate objects;
    c) forming a pair of image elements from the plurality of image elements, the pair comprising a first image element and a second image element;
    d) determining a first distance between the first image element and the second image element;
    e) determining a second distance between a first candidate location corresponding to the first image element and a second candidate location corresponding to the second image element; and
    f) comparing the first and second distances.

2. The method of claim 1, further comprising performing steps (c) to (f) for one or more further pairs of image elements from the plurality of image elements.

3. The method of claim 2, further comprising the step of g):
    i) selecting a first pair of candidate locations having first and second candidate locations corresponding to the first and second image elements of a first of the pairs of image elements; and
    ii) selecting a second pair of candidate locations having first and second candidate locations corresponding to the first and second image elements of a second of the pairs of image elements,
    iii) forming a triplet of candidate locations, the triplet comprising the first pair of candidate locations and the second candidate location of the second pair of candidate locations.

4. The method of claim 3, wherein at least one of step i) and ii) comprises:
    determining a compatibility score for the respective pair of candidate locations based upon the comparison of step (f), and
    making the respective selection based upon that determination.

5. The method of claim 3, further comprising performing step (g) for further pairs of the candidate locations so as to form further triplets of candidate locations.

6. The method of claim 5, further comprising:
    determining compatibility scores for the first and second pairs of the candidate locations of each triplet; and
    selecting a subset of the triplets based on the determined compatibility scores.

7. The method of claim 6, wherein the step of selecting a subset of the triplets comprises ranking the triplets according to their corresponding compatibility scores and selecting a subset of the triplets based on the ranking.

8. The method of claim 6, wherein the selection of a subset of the triplets based on the determined compatibility scores is performed using graph searching.

9. The method of claim 6, further comprising, for each triplet in the subset of triplets, computing an initial pose estimate for the imaged object based on the respective triplet of candidate locations.

10. The method of claim 9, further comprising, for each triplet in the subset of triplets:
    creating an estimated image of the imaged object based on the initial pose estimate of that triplet;
    comparing the estimated image with the image representing the scene including the imaged object; and
    based on the comparison, determining and scoring a refined pose estimate for the triplet.

11. The method of claim 10, further comprising selecting one of the refined pose estimates based on the scores of the refined pose estimates.

12. The method of claim 1, wherein step (b) comprises, for each of the plurality of image elements:
    deriving a descriptor associated with the image element; and
    matching that descriptor to one or more candidate locations in the atlas.

13. The method of claim 1, wherein the image is a depth map and each image element has an intensity value that represents a depth, and further wherein step (d) comprises determining the first distance using image element intensity values.

14. An apparatus or system arranged to perform the method of preceding claim 1.

15. A non-transitory computer-readable medium comprising machine-readable instructions arranged, upon execution by one or more processors, to cause the one or more processors to carry out the method of claim 1.

* * * * *